United States Patent
Fukuchi et al.

(10) Patent No.: US 6,710,292 B2
(45) Date of Patent: Mar. 23, 2004

(54) LASER MACHINING DEVICE

(75) Inventors: Norihiro Fukuchi, Shizuoka (JP); Yasunori Igasaki, Shizuoka (JP); Tsutomu Hara, Shizuoka (JP); Teruo Hiruma, Shizuoka (JP)

(73) Assignee: Hamamatsu Photonics K.K., Shizuoka (JP)

( * ) Notice: Subject to any disclaimer, the term of this patent is extended or adjusted under 35 U.S.C. 154(b) by 18 days.

(21) Appl. No.: 10/181,376

(22) PCT Filed: Dec. 25, 2000

(86) PCT No.: PCT/JP00/09192
§ 371 (c)(1),
(2), (4) Date: Jul. 18, 2002

(87) PCT Pub. No.: WO01/53876
PCT Pub. Date: Jul. 26, 2001

(65) Prior Publication Data
US 2003/0010763 A1 Jan. 16, 2003

(30) Foreign Application Priority Data

| Jan. 19, 2000 | (JP) | 2000-10852 |
| Jan. 19, 2000 | (JP) | 2000-10853 |
| Jan. 19, 2000 | (JP) | 2000-10856 |
| Oct. 19, 2000 | (JP) | 2000-319584 |
| Oct. 19, 2000 | (JP) | 2000-319594 |
| Oct. 26, 2000 | (JP) | 2000-327386 |

(51) Int. Cl.$^7$ ............... B23K 26/06; G02B 27/46; G03H 1/04; G03H 1/16; G02F 1/135

(52) U.S. Cl. ............... 219/121.73; 219/121.75

(58) Field of Search ........... 219/121.6, 121.65, 219/121.67, 121.68, 121.7, 121.73, 121.75

(56) References Cited

U.S. PATENT DOCUMENTS

| 5,523,543 A | * | 6/1996 | Hunter et al. | 219/121.62 |
| 5,948,289 A | * | 9/1999 | Noda et al. | 219/121.69 |
| 6,021,223 A |   | 2/2000 | Toyoda et al. | 382/214 |
| 6,130,009 A | * | 10/2000 | Smith et al. | 430/1 |
| 6,618,174 B2 | * | 9/2003 | Parker et al. | 359/15 |

FOREIGN PATENT DOCUMENTS

| EP | 0 840 159 | 5/1998 |
| JP | 62-44718 | 2/1987 |
| JP | 3-110609 | 5/1991 |
| JP | 5-77067 | 3/1993 |
| JP | 5-94935 | 4/1993 |
| JP | 6-208088 | 7/1994 |
| JP | 10-186283 | 7/1998 |
| JP | 11-6981 | 1/1999 |

* cited by examiner

*Primary Examiner*—Samuel M Heinrich
(74) *Attorney, Agent, or Firm*—Morgan, Lewis & Bockius LLP (57) ABSTRACT

This invention relates to a laser beam machining apparatus equipped with a spatial light modulator. The laser beam machining apparatus according to this invention comprises a reflection-type spatial light modulator, hologram pattern writing means for writing onto said reflection-type spatial light modulator a hologram pattern corresponding to the desired optical image intended to be irradiated onto a target, laser beam irradiating means for irradiating readout light onto said reflection-type spatial light modulator at an incidence angle θ, and a Fourier lens for performing a Fourier transform of said readout light, phase modulated by said reflection-type spatial light modulator. Through use of this laser beam machining apparatus, improvement in utilization efficiency of the readout light and improvement in the level of freedom in machining patterns can be expected.

9 Claims, 10 Drawing Sheets

LASER MACHINING DEVICE

TECHNICAL FIELD

This invention relates to a laser beam machining apparatus having a spatial light modulator.

BACKGROUND ART

As examples of this kind of laser beam machining apparatus, there are the devices disclosed in Japanese Patent Application Laid-open No. Hei5-77067 (below, "Reference 1") and Japanese Patent Application Laid-open No. Sho62-44718 (below, "Reference 2"). However, with these laser beam machining apparatuses, the light and dark pattern displayed on the liquid crystal spatial light modulator is used simply as an aperture mask. As a result, they have the problem of lowered light utilization efficiency because the majority of the light irradiated from the laser light source is obstructed by the mask and cannot be used in machining.

In contrast, in Japanese Patent Application Laid-open No. Hei6-208088 (below, "Reference 3"), an optical marking apparatus is disclosed in which readout light is applied to a spatial light modulator and, doing a Fourier transform on the phase-modulated light, an optical image is reconstructed. Because a Fourier transform is used with this optical marking apparatus, theoretically it is possible to use 100% of the readout light for machining. However, because the spatial light modulator has a transmission-type structure, in actuality, light is obstructed by picture element electrodes, wiring, etc., and the light utilization efficiency ends up dropping.

Because transmission-type spatial light modulators, in this way, have the unavoidable disadvantage of decreased light utilization efficiency, thought was given to using a reflection-type spatial light modulator which should be able to avoid this problem. However, by using the reflection-type spatial light modulator as a simple pattern mask, as with the techniques disclosed in above-mentioned Reference 1 and Reference 2, in practice it is not possible to utilize all 100% of the readout light irradiated onto the spatial light modulator.

To deal with this, in Japanese Patent Application Laid-open No. Hei10-186283 (below, "Reference 4"), a technique is disclosed in which a Fourier transform is performed on the readout light irradiated onto a reflection-type spatial light modulator, and the light utilization factor is improved. In other words, with the technique disclosed in Reference 4, the zero-order light component of the Fourier transform image of the pattern read out from the reflection-type spatial light modulator is phase shifted and, by performing a reverse Fourier transform, it is made to interfere with other light components. By thus forming a re-created image, the contrast ratio of the pattern can be increased.

DISCLOSURE OF THE INVENTION

The inventors, as a result of studying the above-mentioned conventional techniques, discovered the following issue. That is, the technique disclosed in above-mentioned Reference 4 has a structure wherein the re-created image is formed by causing interference between the zero-order light component and other light components. As a result, it only functions effectively in the range of a 25 to 75% duty cycle of the pattern (the portion of the entire screen accounted for by the pattern). In other words, in the technique disclosed in Reference 4, when light of intensity 1 is irradiated from a light source, the intensity I of the output light is given by the following equation:

$$I(x, y) = 2[131 \cos(\phi(x, y))]$$

In other words, the intensity I of the outputted light is in the range of 0 to 4, only reaching 4, even at its maximum. Because this equation for intensity I is invariant, theoretically it is difficult to improve the intensity of the output light above this value. Consequently, even if the duty cycle is 25% or below, the intensity of the output light is not improved above this level, but contrast is worsened and light utilization efficiency also decreases.

In this way, the technique disclosed in Reference 4 was unsuitable for machining of patterns where the duty cycle is small, such as the case where for example only one point on the output surface is irradiated, and there was the problem that the level of freedom for machining patterns was restricted.

With the foregoing in view, it is an objective of this invention to provide a laser beam machining apparatus with a high degree of freedom for machining patterns while enabling improvement in the utilization efficiency of the readout light.

The laser beam machining apparatus according to the present invention comprises a reflection-type spatial light modulator, a hologram writing means for writing onto the reflection-type spatial light modulator a hologram pattern corresponding to the desired optical image one wishes to irradiate onto the target, a laser beam irradiation means for irradiating the readout light onto the reflection-type spatial light modulator with incidence angle $\theta$, and a Fourier lens for performing a Fourier transform of the readout light which has been phase modulated by the reflection-type spatial light modulator.

With this laser beam machining apparatus, the readout light irradiated onto the reflection-type spatial light modulator is modulated according to the hologram pattern and reflected toward the target. Then the phase modulated readout light is Fourier transformed by the Fourier lens. Whereupon, the desired optical image is imaged and machining is carried out on the specified face of the target irradiated with this optical image. With this laser beam machining apparatus, because the readout light, phase modulated by the hologram pattern in this way, is Fourier transformed so that the desired optical image is imaged, one can achieve improved utilization efficiency of the readout light. In addition, because there are no limits on the duty cycle, there is a high level of freedom for machining patterns.

With the laser beam machining apparatus of this invention, the laser beam irradiation means is provided on an incident light axis inclined by the incidence angle of $\theta$ relative to a line normal to the incidence plane irradiated by the readout light of the reflection-type spatial light modulator and the Fourier lens is placed on a reflected beam axis inclined by reflection angle of $\phi$ relative to the normal line within a plane including the normal line and the incident beam axis.

In addition, with the laser beam machining apparatus of this invention, it is preferable if a stage is provided for positioning the target. If this is done, the precision of machining the target is improved.

Further, with the laser beam machining apparatus of this invention, it is preferable if the hologram pattern writing means has storage means for storing the hologram pattern corresponding to the desired optical image to be irradiated onto the target. If this is done, the hologram pattern writing means, simply by reading out the hologram pattern stored in the storage means, can write the hologram pattern onto the reflection-type spatial light modulator. In other words, because the effort of creating a hologram pattern from the desired optical image can be eliminated, it is possible to write the hologram pattern on the reflection-type spatial light modulator at a video rate.

In addition, with the laser beam machining apparatus of this invention, it is preferable for the hologram pattern writing means to have a structure such that a hologram pattern corresponding to a corrected image, that is obtained by modifying the desired optical image by a factor of $1/\cos\theta$ in a specified direction, can be written onto the reflection-type spatial light modulator when the desired optical image is irradiated onto said target. If this is done, the readout light irradiated onto the reflection-type spatial light modulator at an incidence angle $\theta$ is phase modulated according to the hologram pattern and is reflected toward the target in a state which includes the hologram pattern optical image information. This readout light which includes the hologram pattern optical image information undergoes distortion and is modified by a factor of $1/\cos\theta$ in a specified direction. However, because the hologram pattern itself which is the source of the image information included in the readout light corresponds to a hologram pattern of a corrected image modified by a factor of $1/\cos\theta$ in the specified direction, relative to the desired optical image, the effect of distortion can be nullified. Then, the readout light with the effect of this distortion removed is Fourier transformed and an image formed. As a result, the desired optical image is irradiated onto the target.

In addition, it is preferable if the laser beam machining apparatus of this invention also has a masking means positioned on the light path of the readout light from the Fourier lens to the target, for cutting zero-order light. By doing this, the readout light irradiated onto the spatial light modulator is modulated according to the hologram pattern. Then, this phase modulated readout light is Fourier transformed by a Fourier lens. Whereupon, the desired optical image and the zero-order light form an image. There, because a masking means is positioned on the light path of the readout light from the Fourier lens to the target, to cut zero-order light, zero-order light is cut by this masking means and only the desired optical image irradiates the target for performing the machining.

In addition, it is preferable that the laser beam machining apparatus of this invention also comprises an imaging lens for imaging the readout light Fourier transformed by a Fourier lens on the specified face of the target and a masking means positioned on the light path of the readout light from the Fourier lens to the imaging lens for cutting zero-order light. By doing this, the readout light irradiated onto the spatial light modulator is phase modulated according to the hologram pattern. Then, this phase modulated readout light is Fourier transformed by a Fourier lens, and the desired optical image and zero-order light together form an image. Then, after zero-order light is cut by the masking means, by means of the imaging lens the desired optical image alone is irradiated onto the specified face of the target and machining is performed.

In addition, it is preferable that the laser beam machining apparatus of this invention also comprises object position recognizing means for acquiring position information on the target, and the hologram pattern writing means has a structure enabling generation of a hologram pattern matched to position of the target, based on position information on the target acquired by the object position recognizing means. If this is done, even if the position of the target, which is the object to be machined, has shifted from the specified position, the hologram pattern writing means can create a hologram pattern matching the target position, based on the target position information acquired through the object position recognizing means. This makes it possible to do precise machining without being affected by variations in target position.

In addition, it is preferable that the laser beam machining apparatus of this invention also comprises physical body shape recognizing means for acquiring 3-dimensional information on the target, and the hologram pattern writing means has a structure enabling generation of a hologram pattern matched to the shape of the target, based on the 3-dimensional information on the target acquired by the physical body shape recognizing means. If this is done, the hologram pattern writing means can create hologram patterns which form 3-dimensional patterns which match the shape of the target based on the 3-dimensional target information acquired by the physical body shape recognizing means. As a result, cases of a distorted pattern being irradiated onto the target become few, and more precise machining can be done.

The present invention will become more fully understood from the detailed description given hereinbelow and the accompanying drawings. They are given by way of illustration only, and thus should not be considered limitative of the present invention.

BEST MODE FOR CARRYING OUT THE INVENTION

Below, referring to the attached figures, the preferred embodiments of a laser beam machining apparatus according to the present invention are described in detail. Note that elements which are the same in various figures have been assigned the same key number and repetitious descriptions have been left out.

Figure 1:
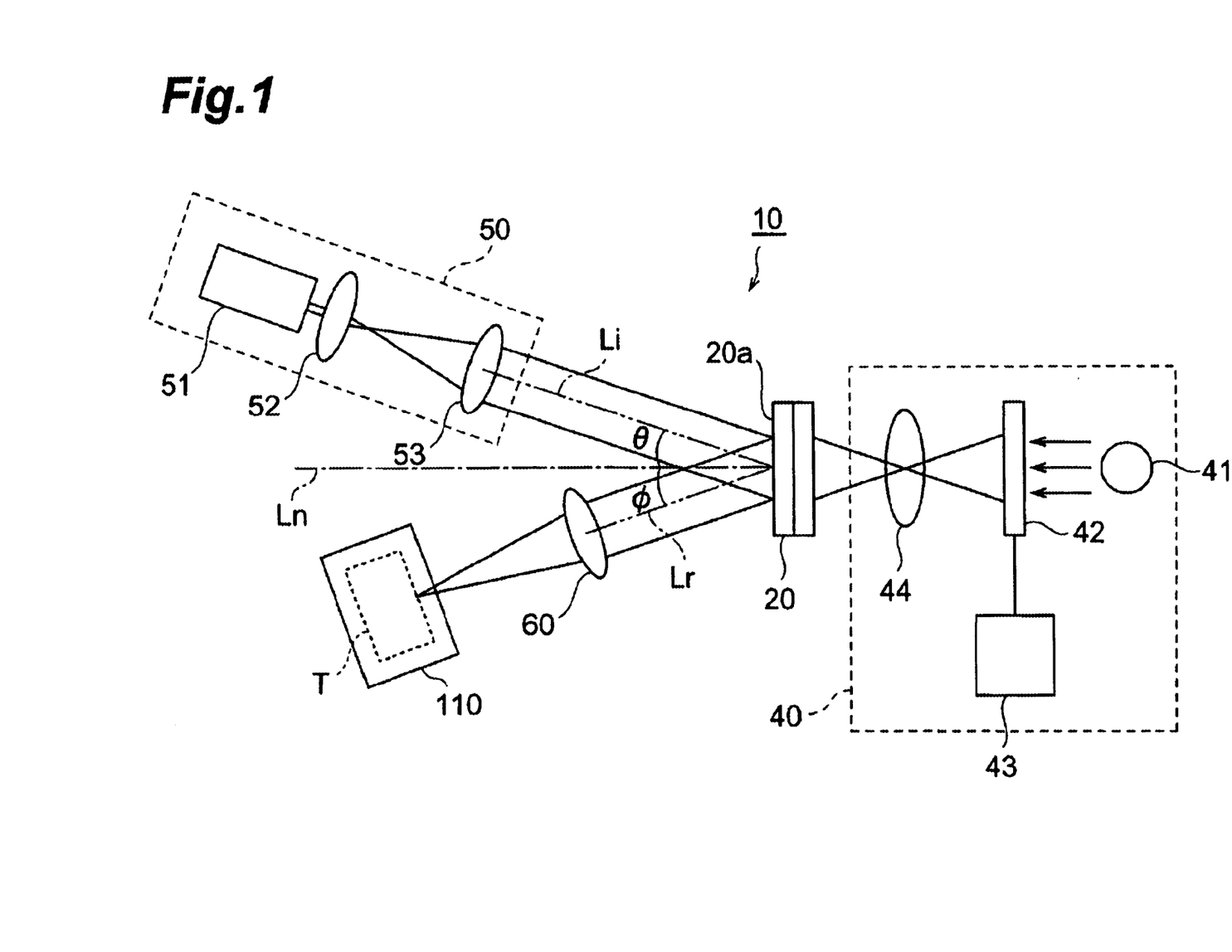
FIG. 1 is a schematic view showing the configuration of the first embodiment of a laser beam machining apparatus according to the present invention.

FIG. 1 is a schematic view showing the configuration of the first embodiment of a laser beam machining apparatus 10 according to the present invention. As shown in the figure, laser beam machining apparatus 10 comprises reflection-type spatial light modulator (SLM) 20, hologram pattern writing means 40, laser beam irradiating means 50, Fourier lens 60, and stage 110 for positioning sample T.

Figure 2:
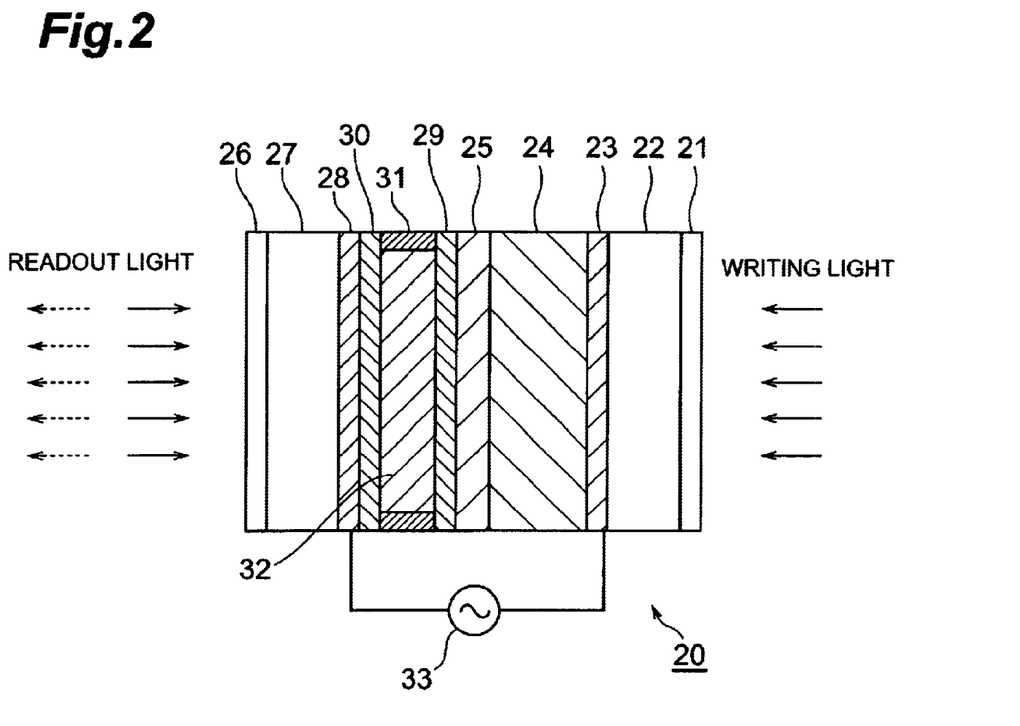
FIG. 2 is a cross-sectional view of the structure of a spatial light modulator comprised in a laser beam machining apparatus.

SLM 20 is a phase modulation type spatial light modulator which uses a parallel orientation nematic liquid crystal as the light modulating material. As shown in FIG. 2, SLM 20 is provided with glass substrate 22 which is treated with AR coating 21 to prevent unnecessary reflection of writing light at the surface on which the writing light is incident. On the incident surface and opposite side surface of this glass substrate 22, two layers are laminated: a photoconductive layer 24 made of amorphous silicon (a-Si) which, via transparent electrode 23 made of ITO (Indium Tin Oxide), changes resistance in response to the intensity of incident light, and mirror layer 25 made of a dielectric multi-layer film. Additionally, SLM 20 is provided with glass substrate 27 which is treated with AR coating 26, similar to the readout light incident surface. Also, laminated on the incident surface and opposite side surface of this glass substrate 27 are transparent electrodes 28 made of ITO, and formed on the above-mentioned mirror layer 25 and transparent electrodes 28, respectively, are orientation layers 29 and 30. These layers 29 and 30, made in opposition to each other, are connected with frame-shaped spacer 31 in between. The space within the frame of spacer 31, is filled with nematic liquid crystal, making a liquid crystal layer and forming light modulating layer 32. By means of these orientation layers 29 and 30, the nematic liquid crystals in light modulating layer 32 are oriented either parallel or perpendicular to the surfaces of orientation layers 29 and 30. Then driver 33 is connected between the two transparent electrode 23 and 28, to apply a specified voltage. Here, when using a Fourier transform hologram, as will be discussed later, to use SLM 20 in the phase modulation mode, it is necessary to match the orientation direction of the liquid crystal molecules and the polarization direction of the readout light. For example, in the case that the readout light irradiates in with P polarization, it is necessary to orient the nematic crystals in light modulating layer 32 to be parallel relative to the surfaces of orientation layers 29 and 30.

As shown in FIG. 1, hologram pattern writing means 40 is positioned on the side of SLM 20 (which has the above-mentioned configuration) on which the writing light irradiated.

Hologram pattern writing means 40 comprises light source 41 for irradiating writing light, transmission-type liquid crystal television 42 for displaying an image of the writing light, electric signal generator for writing use 43 for controlling the image display on transmission-type liquid crystal television 42, and imaging lens 44 for forming on photoconductive layer 24 of SLM 20 an image from the image signal included in the writing light.

Meanwhile, on the side of SLM 20 on which readout light is irradiated, laser beam projecting means 50 is provided on incident light axis $L_i$ which is inclined by incidence angle θ (θ≠0) relative to a normal line $L_n$ in the normal plane of this incident surface 20a. Note that "normal plane" means the plane which, when a linearly polarized light is incident on a mirror and is reflected, includes the axis of the incident light, the axis of the reflected light and a line normal to the mirror.

Laser beam projecting means 50 comprises laser light source 51 for outward irradiation of readout light, lens 52 for magnifying the readout light irradiated from laser light source 51, and collimating lens 53 for modifying the magnified readout light to collimated light.

In addition, Fourier lens 60 is provided on reflected light axis $L_r$ of readout light which is inclined by reflection angle φ relative to a normal line $L_n$ in the normal plane of this incident surface 20a of SLM 20. Here, reflection angle φ is limited by incidence angle θ, and in actuality, incidence angle θ and reflection angle φ are identical.

Stage 110 has the function of performing positioning so that the surface of sample T to be machined comes to the position of the image formed by means of the Fourier lens 60. This stage 110 may, for example, be something like a conveyor which continuously delivers a plurality of samples T.

Laser beam machining apparatus 10 according to this embodiment is configured as described above.

In this regard, with laser beam machining apparatus 10 according to this embodiment, the structure of hologram pattern writing means 40, and in particular the structure of electric signal generator for writing use 43, have some special characteristics.

Specifically, with laser beam machining apparatus 10 according to this embodiment, the desired optical image which is to be irradiated onto sample T is not written onto SLM 20 "as is." Instead, a hologram pattern which, when Fourier transformed by Fourier lens 60, will reproduce the desired optical image is written.

Below, the method for creating the hologram patterns of electric signal generator for writing use 43 is described based on the flowchart of FIG. 3.

As a method for creating a hologram pattern for display on liquid crystal television 42, the "repetitive learning" method can be applied to the image. In particular, in this embodiment, hologram patterns are created using the "Simulated Annealing" technique, which is part of the repetitive learning method.

To do this, consider the case of displaying a hologram pattern on liquid crystal television 42 with n×n pixels. First, for example through use of a random function, determine that the density values of all of the n×n pixels are random, and set this as the initial screen. (Step S1.)

Next, change the density values of specified pixels (Step S2) and judge whether the image obtained by a Fourier transform of that hologram pattern is closer to the desired optical image or not. (Step S3).

Then, if the image obtained by the Fourier transform has come closer to the desired optical image, adopt the density values of those pixels. Even if it has moved further away from the desired image, those density values may be adopted if certain conditions are met, but if those conditions are not met then those density values are not adopted and the original density values are kept.

Next, it is determined whether or not the task of deciding on the density values for all of the n×n pixels has been done (Step S4). Then, if the task has not been completed for all of the pixels, the procedure goes back to Step S2 in which the task of deciding on the density values for the following pixel. If it has been completed for all the pixels, a judgment is made as to whether or not there are any pixels among the n×n pixels for which the changed density value was adopted (Step S5), and if any such pixels were adopted, the procedure returns to Step S2. On the other hand, if no such pixels were adopted, the density value determining work is finished and the pattern thus obtained is displayed on liquid crystal television 42 as the optimum hologram pattern.

Electric signal generator for writing use 43, in this way, obtains a hologram pattern corresponding to the desired optical image and displays it on liquid crystal television 42. Alternatively, electric signal generator for writing use 43 may retrieve hologram pattern data corresponding to the desired optical image, which was prepared ahead of time and stored in a storage means such as a memory, and may display it on a liquid crystal television 42. In this way, electric signal generator for writing use 43, just by reading out hologram pattern data stored in a storage means, can display hologram patterns on liquid crystal television 42. In other words, because the effort of creating a hologram pattern from the desired optical image can be eliminated, it is possible to re-write hologram patterns in the reflection-type spatial light modulator 20 at video rate.

Next will be described operation of the above-mentioned laser beam machining apparatus 10.

First, positioning of sample T is performed by stage 110. Next, the optical image which one actually wants to irradiate onto sample T and thus do machining is inputted into the electric signal generator for writing use 43. Whereupon the hologram pattern corresponding to that desired image is obtained in the electric signal generator for writing use 43, and that hologram pattern is displayed on the liquid crystal television 42.

Next, the writing light is irradiated outward from the light source 41 of the writing light side toward the liquid crystal television 42. Whereupon, as the writing light passes through liquid crystal television 42 the image information of the hologram pattern is written in. The writing light which has this image information, by means of imaging lens 44, forms an image on photoconductive layer 24 of SLM 20. There, an AC voltage, of a few volts is applied between the two transparent electrodes 23 and 28 of SLM 20, by means of driver 33. However, according to the image written into photoconductive layer 24, the electrical impedance of photoconductive layer 24 changes depending on the pixel position. As a result, the partial voltages of the voltage applied to light modulating layer 32 will vary according to pixel location.

Meanwhile, linearly polarized readout light is irradiated outward from laser light source 51. Whereupon, the readout light is modified to collimated light by lens 52 and collimating lens 53. At that time, the light is irradiated onto light modulating layer 32 of SLM 20 as P polarized light. As explained above, in light modulating layer 32, the partial voltage of the applied voltage varies depending on pixel position, and the orientation of the liquid crystal molecules will change depending on that partial voltage. Here, the direction of orientation of liquid crystal molecules changes within the normal plane. As a result, the refractive index of light modulating layer 32 changes depending on the pixel position. The readout light which is incident on light modulating layer 32 is phase modulated according to this change in refractive index, and is reflected by the mirror layer 25 and is outputted again from incident surface 20a.

Then, by Fourier transforming this phase modulated readout light, by Fourier lens 60, and imaging it, the desired optical image can be irradiated onto sample T. As a result, the portions of the sample surface on which the laser beam has impinged are vaporized or materially changed by heat, and the sample is thus machined into the desired pattern.

As explained above, the laser beam machining apparatus 10 according to this embodiment writes hologram patterns into SLM 20 by means of hologram pattern writing means 40. The desired optical image is obtained by Fourier transforming, by means of Fourier lens 60, the writing light, which was phase modulated according to this hologram pattern. Machining can then be done by irradiating this image onto the target. In this way, by utilizing a Fourier transform, the utilization efficiency of the readout light can be improved. Moreover, because SLM 20 has a reflection-type configuration, there is no obstruction of the readout light due to picture element electrodes or wiring as in the case of transparent types and there is no danger that the utilization efficiency of the readout light will decrease. As a result, the intensity of the readout light irradiated from the laser light source 51 may be decreased, thus enabling miniaturization of laser light source 51 and, in its turn, the laser beam machining apparatus 10 itself.

In addition, with this laser beam machining apparatus 10, the intention is not to cause interference between zero-order light components and other light components at the Fourier plane and thus increase contrast, as-with the technology disclosed in Japanese Patent Application Laid-open No. Hei10-186283, which was mentioned as prior art. Thus, there is no restriction on duty cycle and there is no danger of limitations on the level of freedom in machining patterns.

Next, the second embodiment of the laser beam machining apparatus of this invention will be described while referring to FIGS. 1 through 4, FIG. 5A, FIG. 5B, and FIG. 6. Note that elements which are the same as elements described in relation to above-mentioned first embodiment have been assigned the same key numbers, and repetitious descriptions have been left out.

Figure 3:
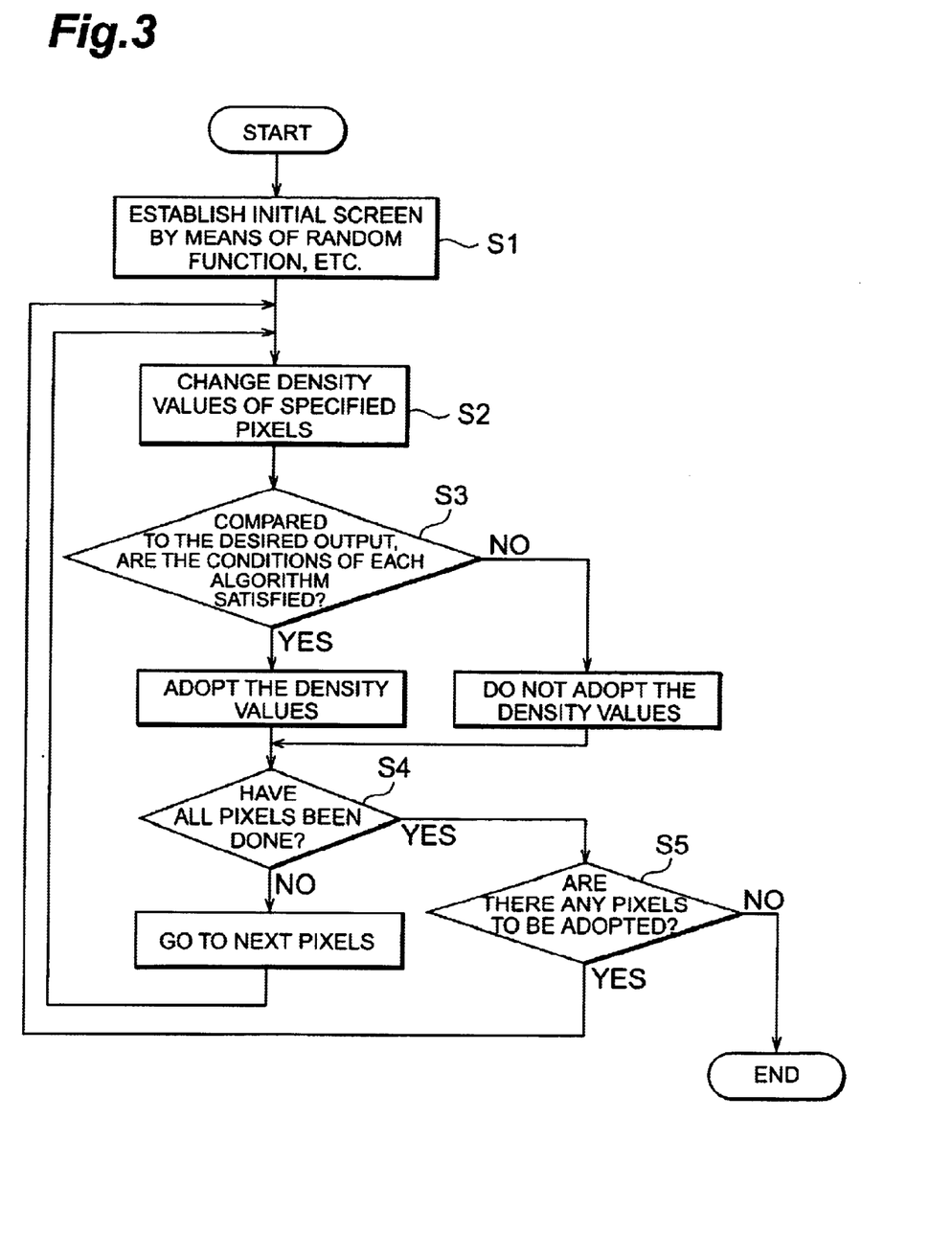
FIG. 3 is a flow chart showing the method of creating hologram patterns.

Laser beam machining apparatus 10 according to this embodiment has the same basic structure as the laser beam machining apparatus according to the above-mentioned first embodiment which was described referring to FIGS. 1 through 3. However, the structures of hologram pattern writing means 40, and particularly that of electric signal generator for writing use 43, are different from the laser beam machining apparatus according to the above-mentioned first embodiment.

In other words, with the laser beam machining apparatus according to the above-mentioned first embodiment, the readout light is irradiated onto reflection-type SLM 20 diagonally, at an incidence angle θ relative to incident surface 20a. By offsetting the light axes of the readout light and the modulated light, modulated light can be obtained and thus, eliminating the use of a half mirror, decrease in the light utilization efficiency is avoided. However, by irradiating the readout light onto incident surface 20a of SLM 20 at an angle, the size of the optical image projected onto target T becomes large compared to the designed size, and there is a danger that the image will extend beyond the area that should be irradiated. In particular, with laser beam machining apparatuses, it is necessary to, project an optical image of the specified size onto the specified location precisely and thus perform the machining, so it is a big problem in this field if the optical image thus hangs over the intended boundaries.

To deal with this, the inventors earnestly studied this "optical image hang over" problem which occurs when the readout light is irradiated diagonally onto SLM 20. As a result, they discovered that distortion was caused to the optical image projected onto target T, in proportion to readout light incidence angle θ.

Figure 4:
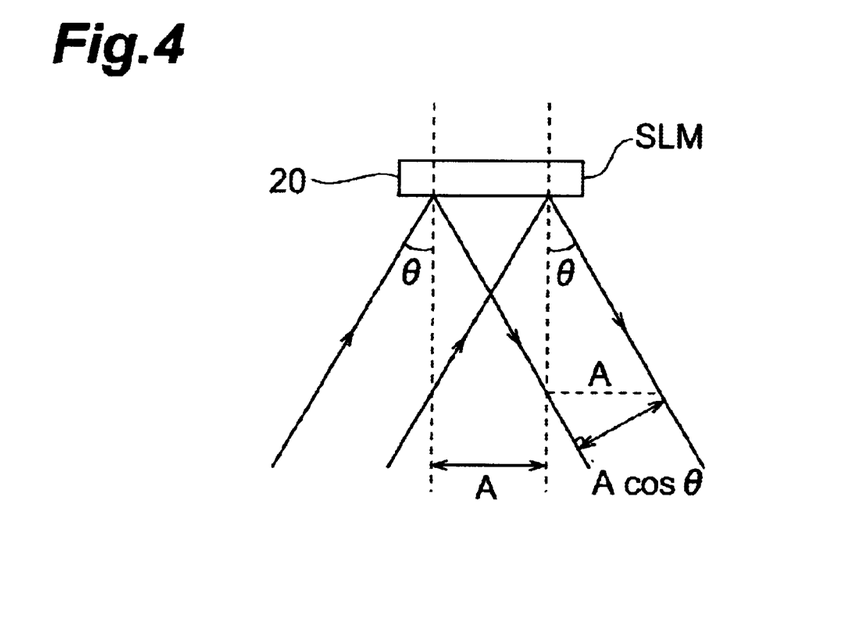
FIG. 4 is a schematic view showing the mechanism by which the readout light, including hologram pattern image information, is reflected by the spatial light modulator and undergoes distortion.
Figure 5A:
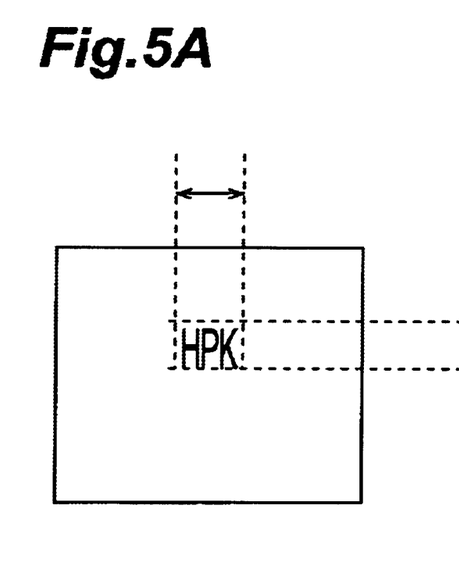
FIG. 5A is a view of the desired optical image which is to be irradiated onto the target.
Figure 5B:
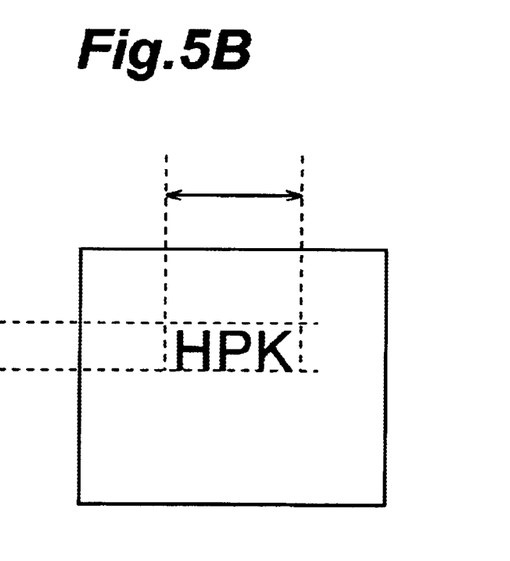
FIG. 5B is a view showing the elongated state of the optical image which has undergone distortion in the width direction, in the case that the hologram pattern corresponding to the desired optical image has not been modified in the width direction by a factor of $1/\cos\theta$.

In other words, as shown in FIG. 4, the readout light is incident on SLM 20 at a specified incidence angle θ and when it is phase modulated by the hologram pattern and reflected, that modulated light is modified in the width direction by a factor of cosθ. In other words, if the width of the hologram pattern displayed on SLM 20 is A, for example, the readout light, including hologram pattern image information, undergoes distortion in the width direction and its width becomes Acosθ. Thus, it became clear that the optical image obtained-by a Fourier transform of this modulated light which is modified by the factor of cosθ, as shown in FIG. 5B, becomes an image stretched in the width direction according to incidence angle θ, compared to the desired optical image shown in FIG. 5A.

To irradiate the optical image precisely onto sample T and prevent its suffering the effect of this distortion, with laser beam machining apparatus 10 of this embodiment, the structure of hologram pattern writing means 40, and particularly that of electric signal generator for writing use 43, is improved.

In other words, electric signal generator for writing use 43 has a structure which creates a corrected image, consisting of the optical image actually projected on sample T modified by a factor of 1/cosθ in the width direction, and enables a hologram pattern corresponding to this corrected image to be obtained and displayed on liquid crystal television 42. That is, if the width of the optical image one actually wishes to project onto sample T is set as B, electric signal generator for writing use 43 has a structure that creates a corrected image whose width is B/cosθ, and enables a hologram pattern corresponding to that corrected image to be found and displayed on liquid crystal television 42.

Figure 6:
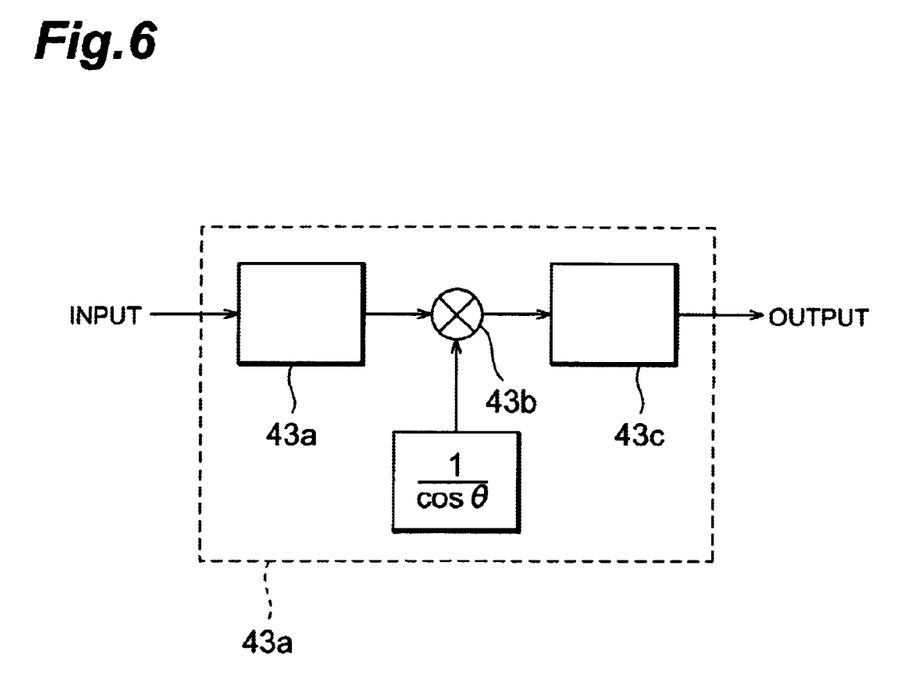
FIG. 6 is a circuit block diagram showing an example of the configuration of an electric signal generator for writing use, which is comprised in the laser beam machining apparatus according to the second embodiment.

One example of a configuration of electric signal generator for writing use 43 for creating this hologram pattern is shown in the circuit block diagram of FIG. 6. As shown in the figure, by inputting information on the optical image one actually wishes to project onto sample T into electric signal generator for writing use 43, that optical image is created by first calculator 43a. Next, a corrected image with width modified by a factor of 1/cosθ of that optical image is created by multiplication calculator 43b. Then, a hologram pattern corresponding to the corrected image is found by second calculator 43c, and the result is outputted to the liquid crystal television 42.

It is acceptable for electric signal generator for writing use 43 to find the hologram pattern corresponding to the desired optical image by calculation each time, but it is also acceptable to retrieve a hologram pattern corresponding to a corrected image which has been created ahead of time (taking into account distortion) and has been stored in a storage means such as a memory, and to display it on liquid crystal television 42. If this is done, it is possible for electric signal generator for writing use 43 to display a hologram pattern on liquid crystal television 42 simply by reading out a hologram pattern stored in a storage means. In other words, because the effort of creating a corrected image from the desired image can be eliminated, it is possible to rewrite hologram patterns into SLM 20 at video rates.

In this way, with the laser beam machining apparatus 10 of this embodiment, hologram writing means 40 has a structure which enables writing into SLM 20 hologram patterns corresponding to a corrected image which consists of the desired optical image modified by a factor of 1/cosθ in the width direction, whenever the desired optical image is to be irradiated onto sample T. Consequently, even if the readout light which includes hologram pattern optical image information, reflected by SLM 20, undergoes distortion and is thus modified by a factor of cosθ in the width direction, because the hologram pattern itself corresponds to a corrected image which is the desired optical image modified by a factor of 1/cosθ in the width direction, the result is that the effect of the distortion is cancelled. As a result, by Fourier transforming the readout light which includes hologram pattern optical image information by Fourier lens 60 and imaging it, the desired optical image can be irradiated precisely onto the proper position on sample T.

Moreover, with this embodiment, since consideration has been given to the case of irradiating readout light at a specified incidence angle θ within the normal plane, the hologram patterns written into SLM 20 were ones which correspond to corrected images which consist of the desired optical image modified by a factor of 1/cosθ in the width direction but unmodified in the height direction. In contrast, in the case that readout light is irradiated at a selectable angle relative to the incident surface 20a of SLM 20, the incident direction of the readout light is broken down into width direction and height method, with the incidence angle in the width direction set as α and that in the height direction as β. Then it is preferable for electric signal generator for writing use 43 to have a structure whereby hologram patterns corresponding to a corrected image, consisting of the desired optical image modified by a factor of 1/cosα in the width direction and 1/cosβ in the height direction, can be written into SLM 20. If this is done, no matter from what direction readout light is irradiated onto the incident surface of SLM 20, it becomes possible to project the desired image onto the specified location of sample T with good precision.

Figure 7:
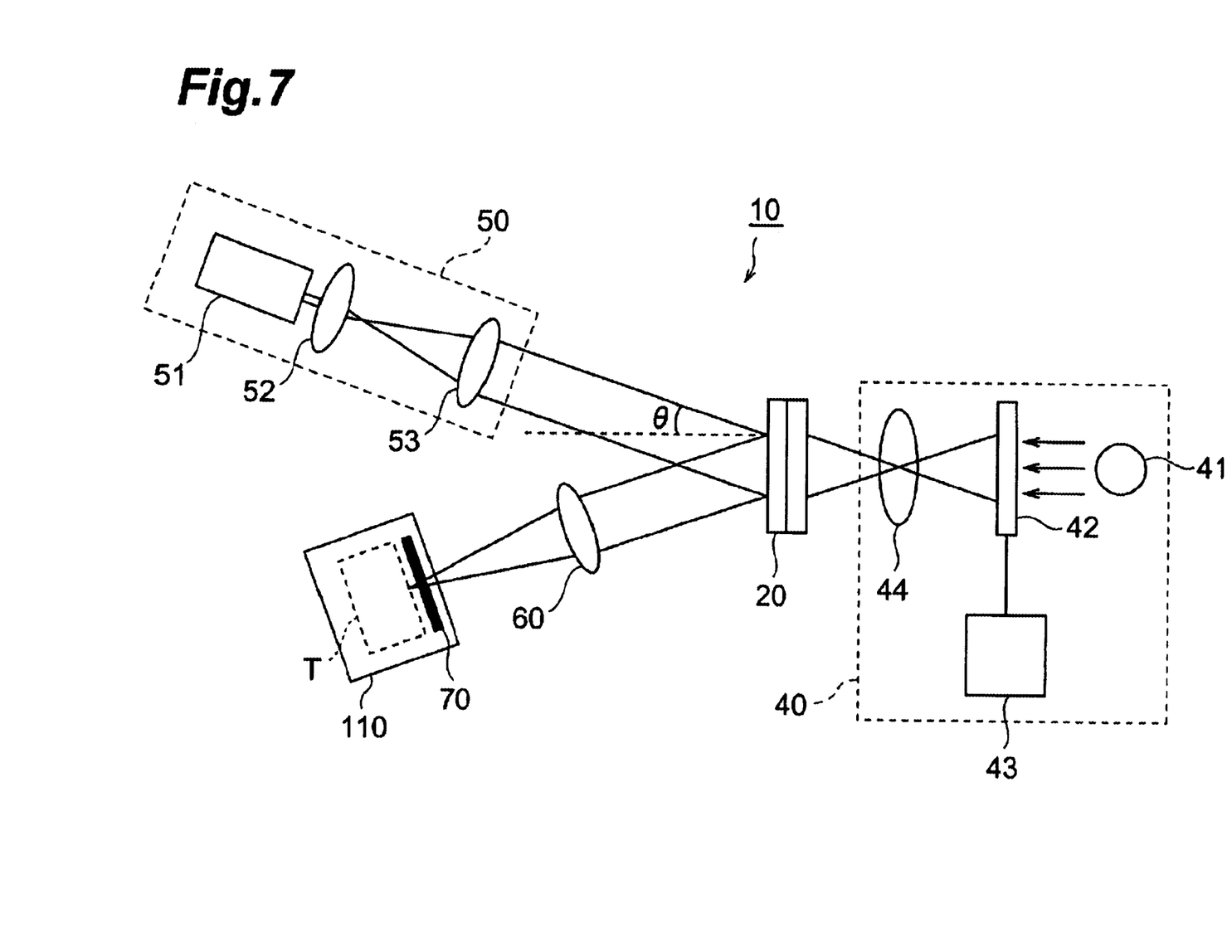
FIG. 7 is a schematic view showing the configuration of the third embodiment of a laser beam machining apparatus according to the present invention.
Figure 8A:
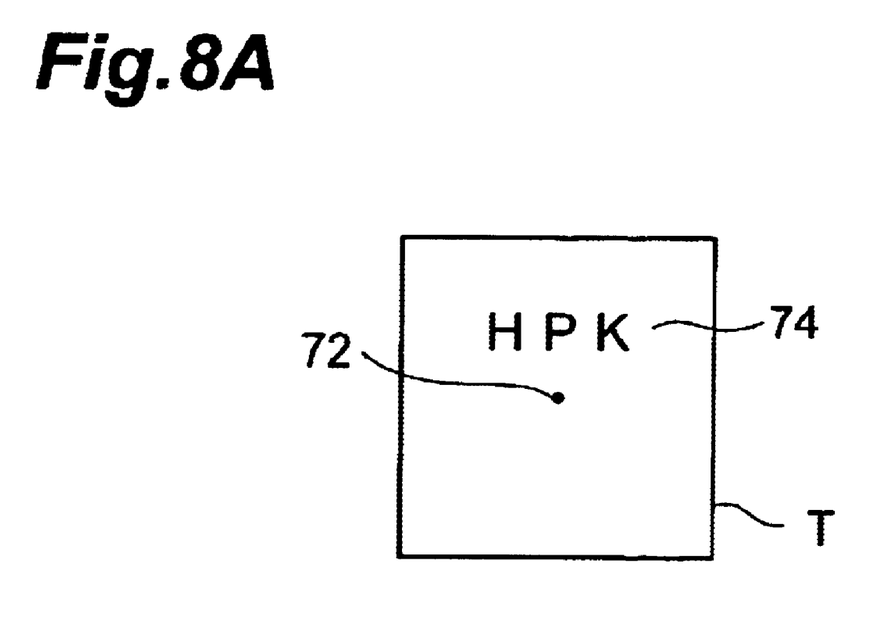
FIG. 8A is a view showing the the surface of a sample to be machined before placement of a zero-order light masking plate.
Figure 8B:
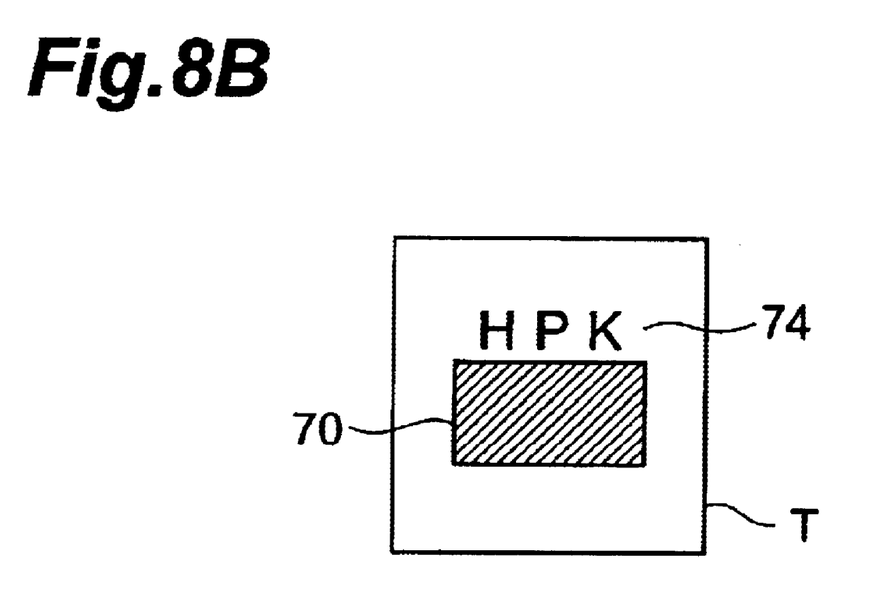
FIG. 8B is a view showing the surface of a sample to be machined after placement of a zero-order light masking plate.

Next, the third embodiment of the laser beam machining apparatus of this invention will be described while referring to FIG. 7, FIG. 8A, and FIG. 8B. Note that elements which are the same as elements described in relation to above-mentioned first and second embodiments have been assigned the same key numbers, and repetitious descriptions have been left out.

With the laser beam machining apparatuses 10 of the first and second embodiments described above, modulated light which has been phase modulated by hologram patterns written onto SLM 20 is Fourier transformed by Fourier lens 60 and imaged into the desired optical image which is then irradiated onto target T. However, when modulated light which has been phase modulated by hologram patterns is Fourier transformed, in addition to the desired pattern, zero-order light appears in the Fourier plane. Thus, in addition to the desired pattern, zero-order light is irradiated at the face of target T to be machined and there is a danger that unintended regions of the target may be machined at the same time.

To deal with this, laser beam machining apparatus 10 according to this embodiment is characterized by having zero-order mask plate 70 provided on the light path from Fourier lens 60 to sample T in order to cut zero-order light. In other words, with laser beam machining apparatus 10 according to this embodiment, as shown in FIG. 7, zero-order light masking plate 70 is positioned just in front of sample T, on the light path of the readout light from Fourier lens 60 to sample T, in order to cut the zero-order light which occurs as a result of Fourier transform of the phase modulated readout light. As shown in FIG. 8A, because zero-order light 72 appears at a certain position on the face of sample T to be machined, zero-order light masking plate 70, as shown in FIG. 8B, is positioned and secured so that only zero-order light 72 is cut without obstructing desired optical image 74.

Note that the material and structure of zero-order light masking plate 70 can be freely selected, as long as they are capable of cutting the zero-order light. For example, zero-order light masking plate 70 may be configured of a metal plate or of a glass plate with metal vapor-deposited thereon, etc.

Because laser beam machining apparatus 10 according to this embodiment has zero-order light masking plate 70 positioned in this way, on the light path of the readout light from Fourier lens 60 to sample T, to cut zero-order light, the zero-order light which occurs as a result of Fourier transform of the readout light phase modulated by SLM 20 can be cut. Thus, only the desired optical image is-irradiated onto sample T and machining of unintended areas by zero-order light can be prevented.

Figure 9:
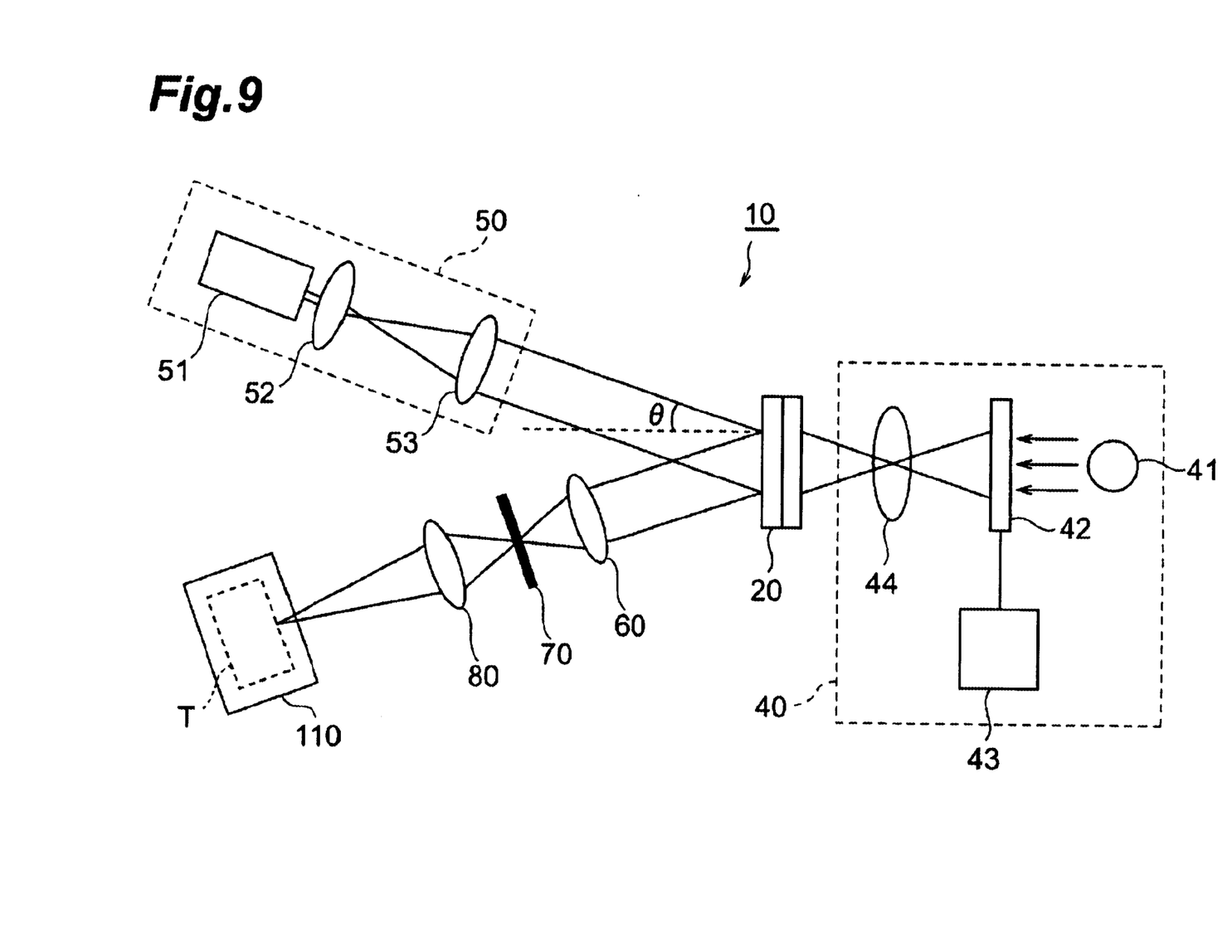
FIG. 9 is a schematic view showing the configuration of the fourth embodiment of a laser beam machining apparatus according to the present invention.

Next, the fourth embodiment of the laser beam machining apparatus of this invention will be described while referring to FIG. 9. Note that elements which are the same as elements described in relation to above-mentioned first through third embodiments have been assigned the same key numbers, and repetitious descriptions have been left out.

Laser beam machining apparatus 10 according to this embodiment is different from that of above-mentioned described third embodiment in that it has imaging lens 80 for imaging the readout light, Fourier transformed by Fourier lens 60, on a specified surface of sample T and zero-order light masking plate 70 for cutting zero-order light is positioned on the light path of the readout light from Fourier lens 60 to imaging lens 80.

In other words, with the third embodiment, readout light was Fourier transformed by Fourier lens 60, and an image was directly formed on the face of sample T to be machined from the desired optical image and the zero-order light, and this zero-order light was cut by zero-order light masking plate 70 position just in front of sample T. In contrast, with this embodiment, first the readout light, Fourier transformed by Fourier lens 60, is imaged and zero-order light is removed by zero-order light masking plate 70. Afterward, by means of imaging lens 80, only the desired optical image is irradiated onto the face of sample T to be machined. Here, because the zero-order light appears at a specific position, it is preferable to position zero-order masking plate 70 at the focal position of the readout light, Fourier transformed by Fourier lens 60. It is also preferable to align it ahead of time so that it cuts only the areas where zero-order light appears, and secure it there.

Laser beam machining apparatus 10 according to this embodiment is equipped in this way with imaging lens 80 for imaging the readout light, Fourier transformed by Fourier lens 60, at the specified surface of sample T. Because zero-order masking plate 70 is positioned on the light path of the readout light from Fourier lens 60 to imaging lens 80, the zero-order light which results from Fourier transform of the readout light phase modulated by SLM 20 can be cut and only the desired optical image is irradiated onto sample T. Thus, the danger of machining unintended portions due to zero-order light can be prevented.

Particularly with this embodiment, because zero-order masking plate 70 is positioned on the light path of the readout light from Fourier lens 60 to imaging lens 80, and secured there, the work of setting apparatus 10 can be simplified compared to the case where it must be aligned just in front of sample T each time and then secured.

Next, the fifth embodiment of the laser beam machining apparatus of this invention will be described while referring to FIG. 10. Note that elements which are the same as elements described in relation to above-mentioned first through fourth embodiments have been assigned the same key numbers, and repetitious descriptions have been left out.

With the laser beam machining apparatuses according to the first through fourth embodiments described above, the case was described wherein a desired pattern is formed on the face of sample T to be machined, that has been positioned in the desired position. However, it will not always be the case that mounted position of sample T is fixed. In the case that the mounting position of sample T is shifted from the desired position, if a pattern is irradiated assuming that sample T is mounted in the desired position, there is a danger that the pattern on the face of sample T to be machined may be enlarged, decreased in size, distorted, etc. causing a decrease in machining precision.

Figure 10:
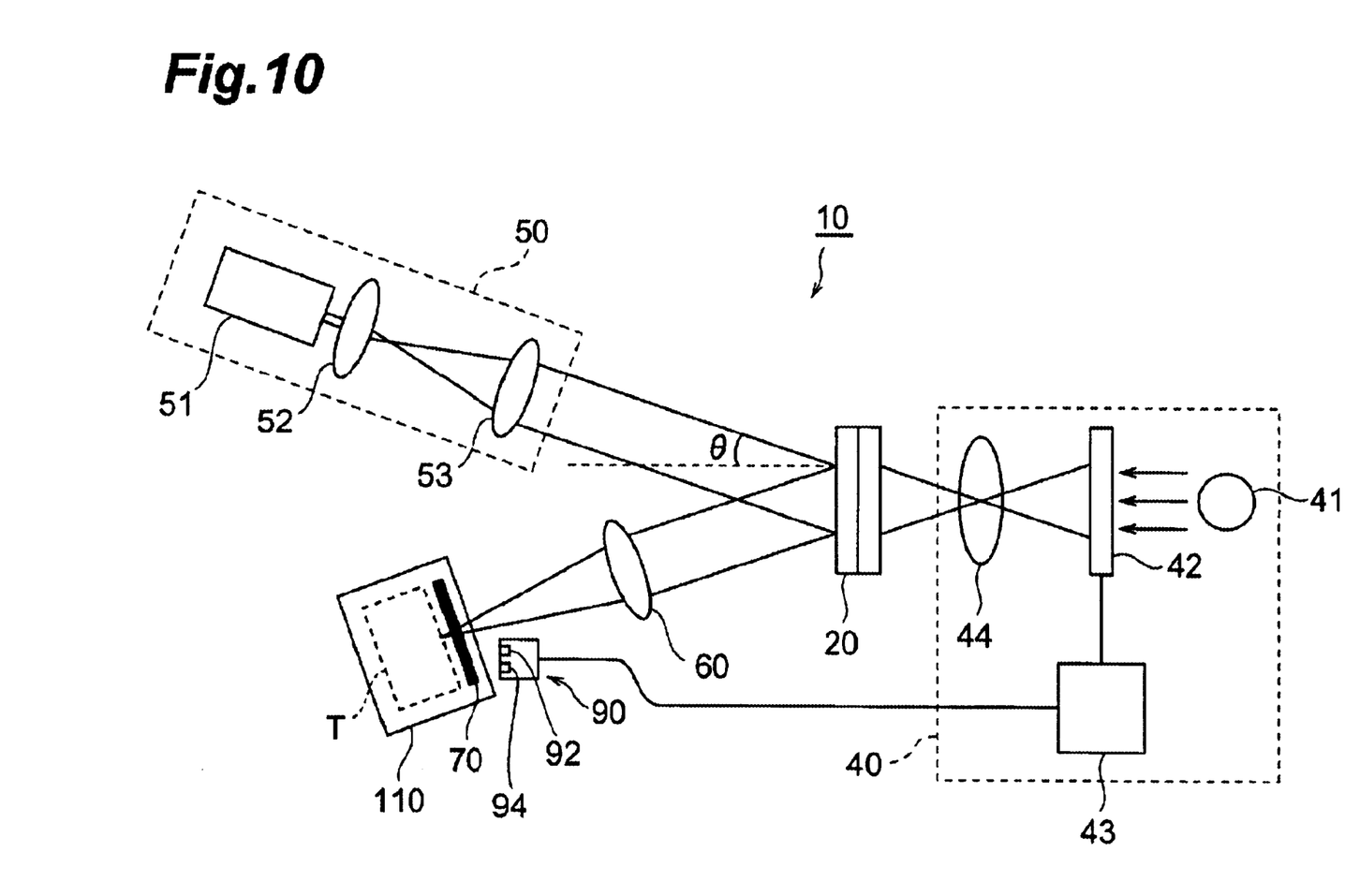
FIG. 10 is a schematic view showing the configuration of the fifth embodiment of a laser beam machining apparatus according to the present invention.

With the laser beam machining apparatus 10 of this embodiment, with these problems in view, an object position recognizing means is additionally provided for acquiring sample T position information, as shown in FIG. 10. This object position recognizing means is equipped internally with a laser distance measuring means 90 which has a photo-emitting element 92, such as a semiconductor diode, and a photo-acceptor element 94, such as a photodiode, etc. This laser distance measuring means 90 sends a laser beam from photo-emitter element 92 toward target T and, the reflected beam being received by photo-acceptor element 94, measures the position of (distance to) the target. This laser distance measuring means 90 is connected to electric signal generator for writing use 43.

With this laser beam machining apparatus 10, the position information of target T measured by laser distance measuring means 90 is sent to electric signal generator for writing use 43. Then, the optical image which one wishes to irradiate onto sample T is inputted to electric signal generator for writing use 43. Whereupon, the hologram pattern corresponding to the desired optical image based on the position of sample T is found by electric signal generator for writing use 43, and that hologram pattern is displayed on liquid crystal television 42.

Next, upon irradiating writing light from light source 41, which is on the writing light side, toward liquid crystal television 42, hologram pattern image information is written into the writing light as it passes through liquid crystal television 42. The writing light which has this image information forms an image on photoconductive layer 24 of SLM 20 by means of imaging lens 44.

Meanwhile, linearly polarized readout light is irradiated from laser light source 51. Whereupon, the readout light is modified into collimated light by lens 52 and collimating lens 53. At that time, the light impinges on light modulating layer 32 of SLM 20 as P polarized light. The readout light which impinges on light modulating layer 32 is phase modulated by the hologram pattern and, reflected by mirror layer 25, is outputted again from the incident surface.

Then, by imaging this readout light phase modulated, by Fourier transform at Fourier lens 60, the desired optical image, matched to the position of sample T, is irradiated onto sample T. As a result, the portions of the sample surface on which the laser beam has impinged are vaporized or materially changed through heat, and the sample is thus machined into the desired pattern.

With the laser beam machining apparatus 10 of this embodiment, because an object position recognizing means is provided for acquiring position information on sample T, it becomes possible to generate patterns matched to the position of sample T. Thus, precise machining is possible without being influenced by variations in the position of sample T.

Next, the sixth embodiment of the laser beam machining apparatus of this invention will be described while referring to FIG. 11. Note that elements which are the same as elements described in relation to above-mentioned first through fifth embodiments have been assigned the same key numbers, and repetitious descriptions have been left out.

With the laser beam machining apparatuses according to the first through fifth embodiments described above, the case of forming the desired pattern on a flat face of sample T for machining was described, but the face of sample T to be machined will not always be flat. In the case that a pattern is irradiated onto a 3-dimensional face of sample T for machining under the assumption that the surface is flat, there is a danger that the pattern will be distorted according to the peaks and valleys of the face of sample T to be machined and that decreased machining precision will result.

Figure 11:
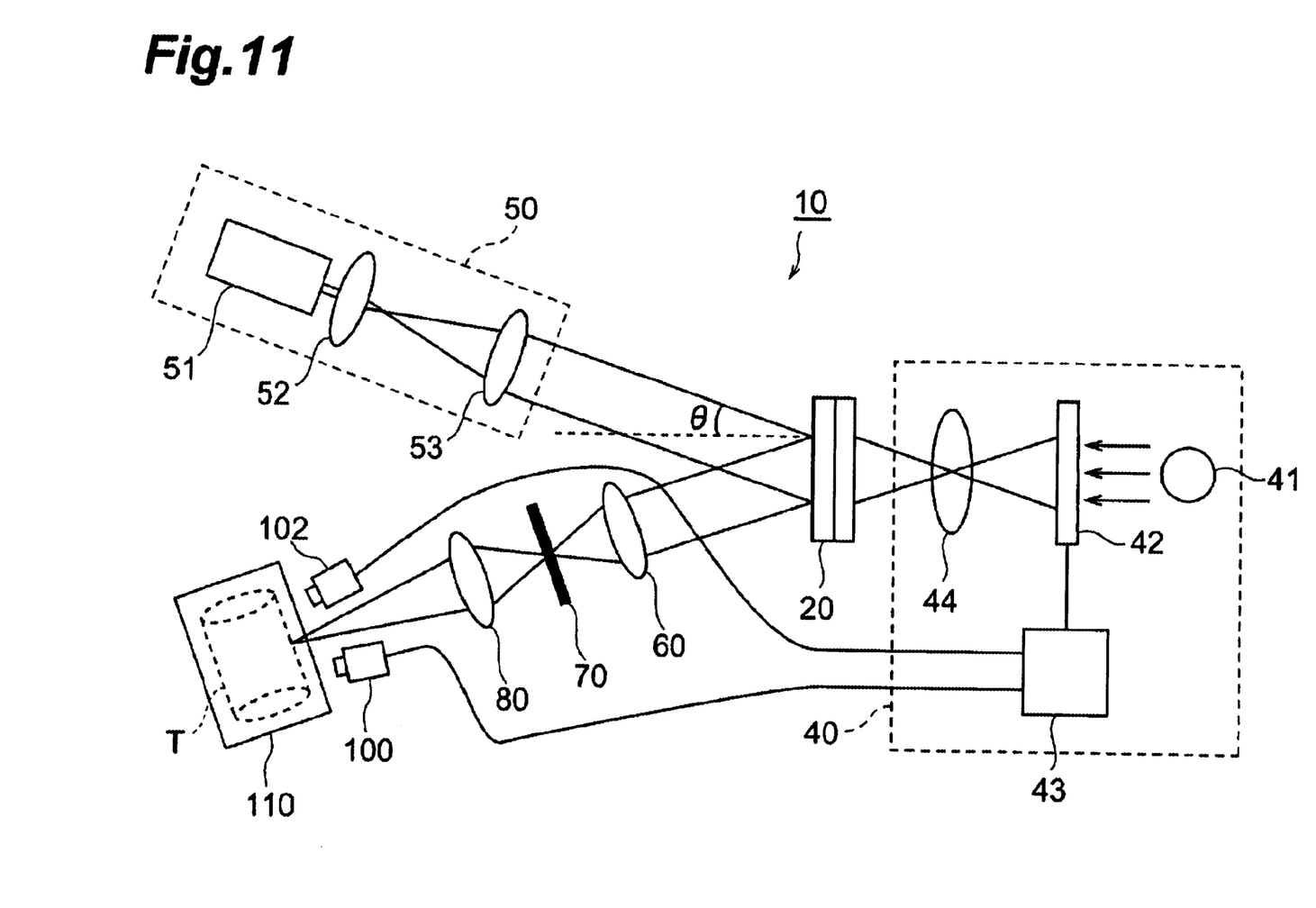
FIG. 11 is a schematic view showing the configuration of the sixth embodiment of a laser beam machining apparatus according to the present invention.

With the laser beam machining apparatus 10 of this embodiment, with this problem in view, a physical body shape recognizing means is additionally provided to acquire 3-dimensional information about sample T, as shown in FIG. 11. This physical body shape recognizing means is equipped with two image capture devices 100 and 102 which can each capture images of sample T. These image capture devices 100 and 102 are positioned essentially symmetrically to the light axis from imaging lens 80 to sample T, and each is connected to electric signal generator for writing use 43.

With this laser beam machining apparatus 10, the stereo images of sample T captured by image capture devices 100 and 102 are each sent to electric signal generator for writing use 43. Then the correspondence between pixels of the two images captured by the pair of image capture devices 100 and 102 is found, and the amount of pixel shift of corresponding points (that is, the parallax) is calculated and, using triangulation, the distance to the target is calculated. By doing this, 3-dimensional information, such as peaks and valleys, can be calculated for sample T, and thus recognition of the 3-dimensional form of sample T can be accomplished. Note that with the laser beam machining apparatus 10 according to this embodiment, because image capture devices 100 and 102, acting as a physical body shape recognition means, can also acquire position information about target T, image capture devices 100 and 102 also function as an object position recognition means.

Then, by inputting into electric signal generator for writing use 43 the optical image, which one actually wants to irradiate onto sample T to machine it, a hologram pattern corresponding to that desired optical image is found by electric signal generator for writing use 43, based the 3-dimensional shape of sample T, and that hologram pattern is displayed on liquid crystal television 42.

Next, upon irradiating writing light from writing side light source 41 toward liquid crystal television 42, hologram pattern image information is written into the writing light as it passes through liquid crystal television 42. The writing light which has this image information is imaged onto photoconductive layer 24 of SLM 20 by means of imaging lens 44.

Meanwhile, linearly polarized readout light is irradiated from laser light source 51. Whereupon, the readout light is modified into collimated light by lens 52 and collimating lens 53. At that time, the light impinges on light modulating layer 32 of SLM 20 as P polarized light. The readout light which impinges on light modulating layer 32 is phase modulated by the hologram pattern and, reflected by mirror layer 25, is outputted again from the incident surface.

Then, after this phase modulated readout light is Fourier transformed by Fourier lens 60, and zero-order light is cut by zero-order light masking plate 70, it is imaged by imaging lens 80. In this way, the desired optical image is irradiated onto a 3-dimensional surface of sample T matched to the shape of sample T. As a result, the portions of the sample surface which the laser beam has irradiated are vaporized or materially changed by heat, and the sample is thus machined into the desired pattern.

With the laser beam machining apparatus 10 of this embodiment, because it is equipped with a physical body shape recognizing means for acquiring 3-dimensional information on sample T, it is possible to create a pattern matched to the shape of sample T and to suppress distortion of the irradiated pattern on the surface of sample T, thus making it possible to prevent any degradation of machining precision. Note that in irradiating the desired pattern onto the surface of sample T to be machined, which has a 3-dimensional shape, the technique disclosed in Patent Application Laid-open No. Hei11-6981 can be used.

INDUSTRIAL APPLICABILITY

With the laser beam machining apparatus according to the present invention, an improvement in the utilization efficiency of the readout light can be expected. Therefore it is possible to achieve miniaturization of the laser beam irradiating means and of the laser beam machining apparatus itself. In addition, with the laser beam machining apparatus according to the present invention, because the level of freedom in machining patterns is high, it is possible to machine targets into a variety of patterns.

From the foregoing explanations of the invention, it will be obvious that the same may be varied in many ways. Such variations are not to be regarded As a departure from the spirit and scope of the invention, and all such modifications as would be obvious to one skilled in the art are intended to be included within the scope of the following claims.

What is claimed is:

1. A laser beam machining apparatus comprising:
   a reflection-type spatial light modulator;
   hologram pattern writing means for writing onto said reflection-type spatial light modulator a hologram pattern corresponding to the desired optical image intended to be irradiated onto a target;
   laser beam irradiating means for irradiating a readout light onto said reflection-type spatial light modulator at an incidence angle $\theta$; and
   a Fourier lens for performing a Fourier transform of said readout light, phase modulated by said reflection-type spatial light modulator.

2. The laser beam machining apparatus according to claim 1, wherein said laser beam irradiating means is provided on an incident beam axis inclined by said incidence angle $\theta$ relative to a line normal to the incidence plane irradiated by said readout light of said reflection-type spatial light modulator and said Fourier lens is placed on a reflected beam axis inclined by reflection angle $\phi$ (=$\theta$) relative to said normal line within a plane including said normal line and said incident beam axis.

3. The laser beam machining apparatus according to claim 1, further comprising a stage for positioning said target.

4. The laser beam machining apparatus according to claim 1, wherein said hologram pattern writing means comprises storage means for storing said hologram pattern corresponding to said desired optical image to be irradiated onto said target.

5. The laser beam machining apparatus according to claim 1, wherein said hologram pattern writing means has a structure such that a hologram pattern corresponding to a corrected image, that is obtained by modifying said desired optical image by a factor of $1/\cos\theta$ in a specified direction, can be written onto said reflection-type spatial light modulator when said desired optical image is irradiated onto said target.

6. The laser beam machining apparatus according to claim 1, further comprising a masking means placed on the light path of said readout light, from said Fourier lens to said target, for cutting zero-order light.

7. The laser beam machining apparatus according to claim 1, further comprising an imaging lens for imaging said readout light, Fourier transformed by said Fourier lens, on a specified surface of said target, and masking means placed on the light path of said readout light that extends from said Fourier lens to said target, for cutting zero-order light.

8. The laser beam machining apparatus according to claim 1, further comprising object position recognizing means for acquiring position information on said target, wherein said hologram pattern writing means has a structure enabling generation of a hologram pattern matched to the position of said target, based on position information on said target acquired by said object position recognizing means.

9. The laser beam machining apparatus according to claim 1, further comprising physical body shape recognizing means for acquiring 3-dimensional information on said target, wherein said hologram pattern writing means has a structure enabling generation of a hologram pattern matched to the shape of said target, based on 3-dimensional information on said target acquired by said physical body shape recognizing means.

* * * * *